United States Patent [19]

Tims

[11] 4,241,106
[45] Dec. 23, 1980

[54] FLOUR TORTILLAS

[75] Inventor: Orinda L. Tims, Walnut Creek, Calif.

[73] Assignee: Standard Brands Incorporated, Wilton, Conn.

[21] Appl. No.: 42,827

[22] Filed: May 29, 1979

[51] Int. Cl.³ .................. A21D 8/00; A21D 13/00
[52] U.S. Cl. .................. 426/138; 426/549; 426/658; 426/391
[58] Field of Search ............ 426/94, 138, 439, 549, 426/658, 391

[56] References Cited

U.S. PATENT DOCUMENTS

| | | | |
|---|---|---|---|
| Re. 19,933 | 4/1936 | Epstein | 426/555 |
| 3,219,455 | 11/1965 | Dubois | 426/549 |
| 3,271,164 | 9/1966 | Andt | 426/24 |
| 3,574,634 | 4/1971 | Singer | 426/62 |
| 3,653,915 | 4/1972 | Rubio | 426/331 |
| 3,655,385 | 4/1972 | Rubio | 426/331 |
| 3,672,912 | 6/1972 | Rubio | 426/331 |
| 3,687,685 | 8/1972 | Rubio | 426/331 |
| 3,690,893 | 9/1972 | Rubio | 426/331 |
| 3,694,224 | 9/1972 | Rubio | 426/331 |
| 3,709,696 | 1/1973 | Rubio | 426/331 |
| 3,730,732 | 5/1973 | Rubio | 426/331 |
| 3,792,174 | 2/1974 | Duarte et al. | 426/532 |
| 3,853,998 | 12/1974 | Rubio | 426/532 |
| 3,859,449 | 1/1975 | Rubio | 426/323 |
| 4,109,018 | 8/1978 | Thompson | 426/62 |

*Primary Examiner*—Raymond N. Jones
*Assistant Examiner*—Elizabeth A. Hatcher
*Attorney, Agent, or Firm*—Richard Kornutik

[57] ABSTRACT

Tortillas which may be stored without substantial loss of flexibility, are prepared from dough comprising wheat flour, water, fat, vital wheat gluten and a hydrophilic gum.

6 Claims, No Drawings

FLOUR TORTILLAS

BACKGROUND OF THE INVENTION

1. Field of the Invention

This invention relates to tortillas which may be stored without substantial loss of their flexibility. More particularly, this invention relates to tortillas prepared from a dough comprising wheat flour, water, fat and suitable amounts and proportions of vital wheat gluten and hydrophilic gum which may be stored prior to use without substantial loss of their flexibility.

Tortillas are conventionally made from whole corn kernels which are treated with alkali and then ground to a flour. The flour is combined with water to form an unleavened dough from which thin flat discs are formed and the discs heated. It is also known to prepare tortillas from wheat flour as taught, for example, in U.S. Pat. No. 3,792,174. Whether made from corn or wheat flour, tortillas, which are pliable when fresh, become hard and inflexible when stored for longer than about 24 hours or even a shorter period.

Tortillas are generally used in preparing foods such as tacos, burritos, enchiladas, etc., which require that heated tortillas be folded over or rolled around a filling of diverse food materials. Although a considerable degree of crispness is desirable in tortillas, they should preferably remain sufficiently pliable upon storage to withstand folding or rolling without substantial cracking or breaking occurring in the areas of stress.

2. Discussion of the Prior Act

There are a number of patents relating to tortillas and processes for preparing the same. The problem of retarding staling and maintaining flexibility in stored tortillas is dealt with in U.S. Pat. Nos. 3,653,915; 3,655,385; 3,672,912; 3,687,685; 3,690,893; 3,694,224; and 3,709,696. These patents teach incorporating into dough prepared from nixtamilized corn or corn flour various materials, e.g., mono- and diglycerides, epichlorohydrin, hydrophilic gums, borates or aluminates, inorganic gels, e.g., aluminum hydroxide, etc. U.S. Pat. No. 3,730,732 relates to a process for increasing the yield of dough and tortillas as well as retarding microbiologlical spoilage therein by adding water soluble alkaline substances, e.g., alkali metal hydroxides and bicarbonates, to a nixtamilized corn dough. U.S. Pat. No. 3,853,998 is directed to retarding microbiological spoilage of tortillas by incorporating alkyl esters of para-hydroxybenzoic acid into corn based dough. U.S. Pat. No. 3,859,449 is concerned with retarding or preventing microbiological spoilage of tortillas by adding acetic or propionic acid or their anhydrides to corn flour dough.

U.S. Pat. No. 3,792,174 relates to a dry mix for preparing tortillas comprising wheat flour, baking powder and other materials.

There are also a number of patents relating to the use of hydrophilic colloids and/or gluten in preparing baked goods.

U.S. Pat. No. Re 19,933 teaches the use of hydrophilic colloids in cake batter to improve the keeping quality of cake products. U.S. Pat. No. 3,219,455 is directed to a bread additive comprising vital wheat gluten, a hydrophilic colloid and an oxidizing agent. U.S. Pat. No. 3,271,164 relates to an additive for retarding staling in baked goods comprising karaya gum, carrageenans and algins.

U.S. Pat. No. 4,109,018 relates to a dough composition for making a low calorie diet bread. The dough comprises wheat flour and a number of other materials including vital wheat gluten and a hydrophilic gum. U.S. Pat. No. 3,574,634 is directed to a low-carbohydrate dough consisting of gluten flour containing vital gluten, a cellulosic filler, vegetable gum and water.

OBJECTS OF THE INVENTION

It is a principal object of the present invention to provide flour tortillas which substantially maintain their flexibility under normal storage conditions.

Other objects and advantages of the present invention will be apparent from the following specification and the appended claims.

SUMMARY OF THE INVENTION

Tortillas which may be stored without substantial loss of their flexibility are prepared from dough comprising wheat flour, water, fat and suitable amounts and proportions of vital wheat gluten and hydrophilic gum.

DETAILED DESCRIPTION OF THE INVENTION

Tortillas which have been freshly made are pliable and exhibit little tendency to crack or break when folded or rolled. When tortillas are stored at room temperature or even under refrigeration and then heated, they no longer exhibit the flexibility which characterizes them when they are fresh. Such loss of flexibility is due to physico-chemical changes in the starch component of the flour. This phenomenon is known as retrogradation and principally involves association of the linear amylose molecules of the starch. Starch pastes or sols containing reduced concentrations of amylose exhibit a lesser tendency to retrograde upon standing. Chemical and moisture-retaining additives which inhibit staling in leavened baked goods are unsuitable for retarding loss of flexibility in flour tortillas because their use generally results in a soft, easily crumbled or otherwise unsatisfactory product. Physical measures which retard loss of moisture, e.g., storing the tortillas in moisture proof containers may delay the onset of staling briefly but do not appreciably alter the effects of starch retrogradation. Similarly, although incorporating hydrophilic materials into dough from which flour tortillas are prepared is somewhat effective in retaining moisture in the finished product, such materials do not solve the problem of loss of flexibility due to starch retrogradation in stored tortillas.

Gluten is the name given to an insoluble proteinaceous material which forms when flour is hydrated. Vital wheat gluten is a commercial product comprising undenatured gluten obtained from hydrated wheat flour. The principal use of such gluten is to fortify flour used for making bread and other leavened bakery products wherein it supplements the protein of the flour. Among its other uses are increasing the protein content of certain non-bakery food products and as a diluent or binder in tableted formulations and the like.

Incorporating either a hydrophilic gum or vital wheat gluten separately into a wheat flour tortilla dough provides little or no improvement in the flexibility of stored tortillas. It is surprising, therefore, that tortillas prepared from unleavened dough wherein both a hydrophilic gum and vital wheat gluten have been incorporated maintain their flexibility for an extended period and the adverse effects of starch retrogradation are minimized. Apparently, the combined use of the concerned additives produces an unexpected synergistic effect which neither additive alone is capable of providing.

There are a number of hydrophilic gums which may be used in the present invention together with the vital gluten. These gums include guar, karaya, locust bean and tragacanth and it is comtemplated that others may also be used. The preferred gum is guar gum.

The amounts and proportions of hydrophilic gum and vital wheat gluten incorporated into the torilla dough are important in achieving the results of the present invention. Satisfactory results have been obtained utilizing from about 1 to about 2 percent gum together with from about 3 to about 4 percent vital gluten by weight based on the weight of the flour used. The preferred amounts are about 1 percent gum together with about 4 percent gluten on the same weight basis. It will be appreciated that the exact amounts and proportions utilized may vary with the composition of the dough, the nature of the flour utilized and similar considerations.

A large number of wheat flours are available which are suitable for utilization in the present process. Satisfactory results have been obtained utilizing commercial wheat flour conventionally used for preparing bread and similar baked goods and having a protein content of about 12 to 13 percent. Although any fat conventionally employed in the preparation of baked goods may be utilized in the present process, good results have been obtained using lard in the tortilla dough. Additional ingredients, e.g., condiments, seasonings, preservatives, etc. may also be incorporated.

Typically, in commerical practice tortilla dough is passed from a hopper or the like through extruding rollers to produce thin, flat sheets, the rollers generally being provided with means for cutting the flattened dough into pieces of the desired shape. The pieces may then be cooked by any suitable means, for example, by quickly baking them in an oven at high temperature or by passing them on a belt over a hot flame, the belt mechanism being provided with means for turning the pieces to expose both sides thereof to the flame. Typically, the finished tortilla will have a moisture content of about 30 to 32 percent.

In order to more clearly describe the nature of the present invention, a specific example will hereinafter be described. It should be understood, however, that this is done solely by way of example and is intended neither to delineate the scope of the invention nor limit the ambit of the appended claims. In the example and throughout the specification, percentages refer to percent by weight and are based on the weight of the final product unless otherwise specified.

EXAMPLE

This example illustrates the effect of incorporating a hydrophilic gum or vital wheat gluten alone or various combinations of said materials into a wheat flour tortilla dough on the flexibility of stored tortillas prepared from such dough.

Varying amounts of guar gum or vital wheat gluten or both were incorporated into doughs suitable for preparing tortillas, each dough comprising 300 lbs. of wheat flour, 22 gals. of water and 18 lbs. of lard. The doughs were handled in a conventional manner and formed into thin discs which were baked to provide tortillas. The tortillas were cooled, packaged in airtight containers and then stored under refrigeration for seven days. Dough prepared and treated in an identical manner but not containing added gum or vital gluten served as a control. At the end of the storage period, the tortillas were subjected to a test which best simulates actual usage in order to determine their flexibility. The containers, each containing 24 tortillas, were opened and placed in a steam cabinet for two hours following which a measured amount of a meat sauce filling was placed on each tortilla. The tortillas were then folded in on the sides and rolled in the traditional manner. The filled tortillas were examined for breakage such as tearing or cracks appearing at the folds and/or on the surfaces. The tortillas exhibiting the least amount of breakage were judged to be the most flexible.

The amounts of guar gum, vital gluten or both incorporated into the various doughs and the effects thereof on flexibility of the stored tortillas are shown in Table I below:

TABLE I

| Material Added to Tortilla Dough | | Flexibility of Stored Tortillas |
|---|---|---|
| Guar Gum (lbs.) | Vital Wheat Gluten (lbs.) | (based on 24 tortillas per dough formula) |
| 0 | 0 | inflexible; all showed breakage |
| 3 | 0 | inflexible; all showed breakage |
| 6 | 0 | inflexible; all showed breakage |
| 0 | 12 | inelastic; dry, leathery, tough |
| 0 | 15 | inflexible; all showed breakage |
| 0 | 25 | inflexible; all showed breakage |
| 3 | 12 | flexible, elastic; none showed breakage |
| 3 | 9 | improved flexibility; ⅜ showed breakage |
| 3 | 6 | inflexible; all showed breakage |
| 5 | 9 | improved flexibility; ⅜ showed breakage |
| 3 | 10 | improved flexibility; ½ showed breakage |

The data in the above table show that stored tortillas prepared from dough containing added vital wheat gluten and hydrophilic gum in suitable amounts and proportions exhibited improved flexibility over stored tortillas prepared from dough to which these materials had not been added.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A tortilla having improved flexibility upon storage comprising wheat flour, water, fat and from about 1 to about 2 percent hydrophilic gum and from about 3 to about 4 percent vital wheat gluten, based on the weight of the flour used.

2. A tortilla according to claim 1, wherein the amount of the hydrophilic gum is about 1 percent and the amount of vital wheat gluten is about 4 percent, based on the weight of the flour used.

3. A tortilla according to claim 1, wherein the hydrophilic gum is guar gum.

4. A method for preparing tortillas having improved flexibility upon storage comprising incorporating into an unleavened wheat flour dough from about 1 to about 2 percent hydrophilic gum and from about 3 to about 4 percent vital wheat gluten, based on the weight of the flour used, forming the dough into pieces of the desired shape and size and heating the pieces.

5. A method for preparing tortillas according to claim 4, wherein about 1 percent hydrophilic gum and about 4 percent vital wheat gluten, based on the weight of the flour used, are incorporated into the dough.

6. A method for preparing tortillas according to claim 4, wherein the hydrophilic gum is guar gum.

* * * * *